United States Patent
Fukuyama et al.

(10) Patent No.: US 6,823,697 B2
(45) Date of Patent: Nov. 30, 2004

(54) PRESS FORMING MACHINE FOR OPTICAL DEVICES

(75) Inventors: Satoshi Fukuyama, Numazu (JP); Isao Matsuzuki, Numazu (JP); Hiroaki Fujii, Numazu (JP)

(73) Assignee: Toshiba Machine Co., Ltd., Tokyo (JP)

( * ) Notice: Subject to any disclaimer, the term of this patent is extended or adjusted under 35 U.S.C. 154(b) by 221 days.

(21) Appl. No.: 09/860,569

(22) Filed: May 21, 2001

(65) Prior Publication Data

US 2001/0054301 A1 Dec. 27, 2001

(30) Foreign Application Priority Data

Jun. 27, 2000 (JP) ........................................ 2000-192841

(51) Int. Cl.$^7$ ............................................. C03B 11/08
(52) U.S. Cl. ............................. 65/319; 65/308; 65/356
(58) Field of Search .............................. 219/552, 553, 219/408.1, 461.1, 460.1, 413.1; 65/319, 355, 556, 207, 208; 392/407, 416, 418

(56) References Cited

U.S. PATENT DOCUMENTS

| | | | | |
|---|---|---|---|---|
| 4,004,128 A | * | 1/1977 | Marchesi ..................... | 219/346 |
| 5,782,946 A | * | 7/1998 | Komiyama et al. ........... | 65/102 |
| 5,938,807 A | * | 8/1999 | Komiyama et al. ......... | 65/29.12 |
| 6,354,901 B1 | * | 3/2002 | Bundo et al. ................. | 445/26 |
| 6,370,918 B2 | * | 4/2002 | Fukuyama et al. ........... | 65/319 |
| 2002/0053564 A1 | * | 5/2002 | Taylor et al. ............. | 219/461.1 |

FOREIGN PATENT DOCUMENTS

| | | | | |
|---|---|---|---|---|
| JP | 63-170228 | | 7/1988 | |
| JP | 64-45734 | | 2/1989 | |
| JP | 5-186230 | | 7/1993 | |
| JP | 2001-026432 | * | 1/2001 | ........... C03B/11/12 |

OTHER PUBLICATIONS

Machine translation of JP 2001–026432 from jpo.org on Apr. 24, 2003.*

* cited by examiner

Primary Examiner—Steven P. Griffin
Assistant Examiner—Carlos Lopez
(74) Attorney, Agent, or Firm—Pillsbury Winthrop LLP

(57) ABSTRACT

An object of the present invention is to provide a press forming machine for glass optical devices which is superior in the temperature uniformity and has a low manufacturing cost. An upper die is fixed to a lower end of a fixed shaft, and a lower die is fixed to an upper end of a moving shaft. The upper die and the lower die are accommodated in a quartz tube, and a forming chamber in which atmosphere adjustment is possible is formed inside the quartz tube. An infrared lamp unit is arranged so as to surround the quartz tube. The infrared lamp unit is constituted by a plurality of straight tube type infrared lamps each of which has a vertical axis, and a reflecting mirror is arranged behind each infrared lamp. In this example, straight tube type infrared lamps are used in the infrared lamp unit.

2 Claims, 2 Drawing Sheets

PRESS FORMING MACHINE FOR OPTICAL DEVICES

CROSS-REFERENCE TO RELATED APPLICATIONS

This application is based upon and claims the benefit of priority from the prior Japanese Patent Application No. 2000-192841, filed Jun. 27, 2000, the entire contents of which are incorporated herein by reference.

BACKGROUND OF THE INVENTION

The present invention relates to a press forming machine for optical devices which manufactures a glass optical device such as an optical lens or a prism by press forming.

In a press forming machine for a glass optical device, a die and a glass material are heated and press forming of the glass material is then carried out by using the die. Methods generally used for heating the die and the glass material can be roughly classified into two types. One type is high-frequency induction heating and disclosed in, for example, Jpn. Pat. Appln. KOKAI Publication Nos. 64-45734 and 63-170228. The other type is radiant heating using an infrared lamp and disclosed in, for example, Jpn. Pat. Appln. KOKAI Publication No. 5-186230.

Of these types of method, high-frequency induction heating has a problem in depth of penetration of the high-frequency and it is difficult to evenly heat a metal portion of the die. On the contrary, radiant heating using an infrared lamp can readily realize the even temperature distribution and is suitable for press-forming an optical device having the high accuracy.

FIG. 3 shows an outline (cross-sectional view in a lateral direction) of an infrared lamp unit used in a press forming machine disclosed in Jpn. Pat. Appln. KOKAI Publication No. 5-186230. This infrared lamp unit 43 is constituted by forming a substantially annular sub unit by combining two pairs of a semi-arc infrared lamp 41 and a reflecting mirror 42 and superimposing a plurality of the sub units in the vertical direction.

When the infrared lamp unit 43 is constituted in this manner, a gap is formed at an opposed portion of the infrared lamp 41 in the circumferential direction as indicated by an arrow Z in FIG. 3. In case of press-forming a typical optical device, the sufficient accuracy of form can be obtained even if such an infrared lamp unit 43 is used. If the higher accuracy of form is demanded, however, astigmatism of a press-formed product caused due to the temperature distribution in the circumferential direction becomes a problem. Further, the casing of the infrared lamp must be processed into a semi-circular shape, which leads to increase in cost for manufacturing the lamp unit.

BRIEF SUMMARY OF THE INVENTION

The present invention has been made in view of the above-described problems of the conventional heating methods in the press forming machine for a glass optical device. It is an object of the present invention to provide a press forming machine which is superior in the temperature uniformity of a die to be heated and has a manufacturing cost lower than that of a machine using a conventional arc infrared lamp unit.

According to the present invention, there is provided a press forming machine for a glass optical device, comprising:

a pair of upper and lower dies for press-forming a glass material; and an infrared lamp unit which is arranged around the dies and heats the dies and the glass material; wherein the infrared lamp unit is constituted by straight tube type infrared lamps, and each of the infrared lamp has a vertical axis and is arranged around the dies in the circumferential direction.

According to the press forming machine for a glass optical device of the present invention, since the infrared lamp unit is constituted by arranging a plurality of the straight tube type infrared lamps in the above-described manner, it is superior to a conventional infrared lamp unit constituted by combining semi-circular infrared lamps in the temperature uniformity in the circumferential direction of the dies to be heated. As a result, it is possible to manufacture a glass optical device having the high accuracy of form. Further, since the straight tube type infrared lamp is used, the manufacturing cost can be lower than that of the conventional semi-circular infrared lamp.

Preferably, in the press forming machine for a glass optical device according to the present invention, in order to cool down a terminal portion of the straight tube type infrared lamp, a nozzle for directly blasting air or an inert gas to the terminal portion is provided.

Preferably, dimples are formed on an casing of the straight tube type infrared lamp. Consequently, slack of filaments can be avoided at the time of heating, thereby extending the life duration of the infrared lamp.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
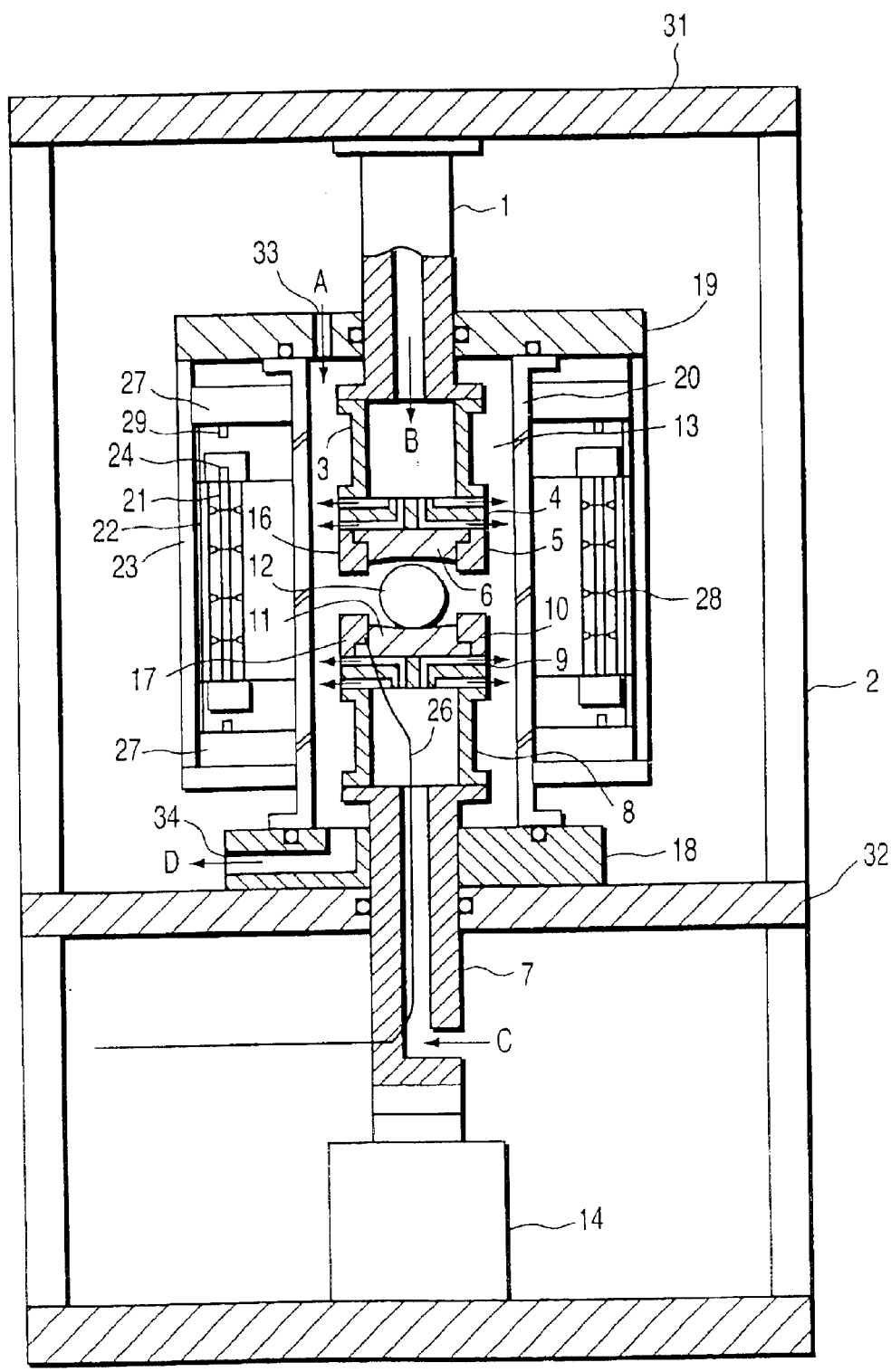
FIG. 1 is an overall block diagram showing an example of a press forming machine for an optical device according to the present invention.

FIG. 1 shows an example of an overall structure of a press forming machine for a glass optical device according to the present invention. In the drawing, reference numeral 12 denotes a preform (glass material); 16, an upper die; 17, a lower die; 21, a straight tube type infrared lamp; 22, a reflecting mirror; 23, an infrared lamp unit; 24, a terminal portion of an infrared lamp; and 28, a dimple.

A fixed shaft 1 is fixed to a beam 31 of a ceiling portion of a frame 2 in the machine and extends downwards. A moving shaft 7 is connected to the upper portion of a driving unit 14 accommodated in a lower portion of a base plate 32 in the machine, pierces the base plate 32 and extends upwards so as to be opposed to the fixed shaft 1.

To the lower end of the fixed shaft 1 is fixed the upper die 16 through a heat insulating cylinder 3. The upper die 16 is constituted by a fixed die plate 4, a fixed die 5 and an upper cavity die 6. The fixed die plate 4 is attached to the lower end of the heat insulating cylinder 3, and the upper cavity die 6 is disposed to the lower surface of the fixed die plate 4. Further, the fixed die 5 is fixed on the lower surface of the fixed die plate 4 by the upper cavity die 6 which is arranged to surround the periphery of the fixed die 5.

Similarly, the lower die 17 is fixed to the upper end of the moving shaft 7 through a heat insulating cylinder 8. The lower die 17 is constituted by a moving die plate 9, a moving die 10 and a lower cavity die 11. The moving die plate 9 is attached to the upper end of the heat insulating cylinder 8, and the lower cavity die 11 is disposed on the upper surface of the moving die plate 9. Further, the moving die 10 is fixed to the upper surface of the moving die plate 9 by the lower cavity die 11 which is arranged to surround the periphery of the moving die 10. A thermocouple 26 is attached to the lower die 17, and this thermocouple 26 is drawn to the outside through the inside of the heat insulating cylinder 8 and the moving shaft 7.

In this example, the heat insulating cylinders 3 and 8 are made of ceramics ($Si_3N_4$); the fixed die and the moving die 10, tungsten alloy; the upper cavity die 6 and the lower cavity die 11, sintered hard alloy; and the fixed die plate 4 and the moving die plate 9, sintered hard alloy.

Incidentally, besides the sintered hard alloy, it is possible to use for the upper and lower cavity dies 6 and 11 ceramics such as TiC, $Si_3N4$, TiN or a material obtained by applying coating of other ceramics or noble metal on the surface of the former ceramics. Similarly, these types of ceramics can be used for the upper and lower die plates 4 and 9.

The upper die 16, the lower die 17, and the upper and lower insulating cylinders 3 and 8 are accommodated in a quartz tube 20. An upper plate 19 is attached around the part near the lower end of the fixed shaft 1, and a lower plate 18 is disposed around the part near the upper end of the moving shaft 7. The lower plate 18 is supported on a base plate 32. An O-ring is mounted on the contact surface where the upper end surface of the quartz tube 20 comes into contact with the upper plate 19, and the contact surface is sealed by the O-ring. Similarly, an O-ring is also mounted on the contact surface where the lower end surface of the quartz tube 20 comes into contact with the lower plate 18, and the contact surface is sealed by this O-ring. A forming chamber 13 capable of adjusting the atmosphere is formed inside the quartz tube 20.

An infrared lamp unit 23 is arranged so as to surround the periphery of the quartz tube 20. The infrared lamp unit 23 is constituted by a plurality of straight tube type infrared lamps 21 each having a vertical (direction of the center axis of the fixed shaft 1 and the moving shaft 7) axis, reflecting mirrors 22 respectively arranged behind the infrared lamps 21, and others.

In this example, the infrared lamp 21 is a halogen lamp using coil-type filament consisting of tungsten. Although there are various wavelength ranges of the infrared lamps 21, this example employs a typical infrared lamp having a peak wavelength of 1.2 $\mu$m to 1.8 $\mu$m.

Dimples are formed on the casing of the infrared lamp 21, which prevents slack of the filament by self-weight at the time of heating the lamp.

The reflecting mirror 22 is obtained by forming an aluminium plate into a curved shape, polishing the surface and thereafter applying gold plating. The reflecting mirror 22 is arranged so as to surround each infrared lamp 21 from behind. When the upper die 16 and the lower die 17 are irradiated with the infrared light from the infrared lamps 21 through the quartz tube 20, the upper die 16 and the lower die 17 are heated. A water cooling pipe (not shown) is arranged inside the reflecting mirror 22 in order to avoid damages to the reflecting mirror 22 due to overheating.

Air buffers 27 are respectively provided so as to be adjacent to the upper and lower end portions of the straight tube type infrared lamp 21. A nozzle 29 is formed to the air buffer 27 at a position facing each terminal portion 24. By blasting air directly to the respective terminal portions 24 from these nozzles 29, the respective terminal portions 24 can be cooled down.

A supply port 33 for an inert gas (a nitrogen gas in this example) is provided to the upper plate 19, and an exhaust port 34 for the inert gas is provided to the lower plate 18. A through hole for leading the inert gas is provided at the center of the fixed shaft 1, and a through hole for leading the inert gas is likewise provided to the center of the moving shaft 7. A through hole communicating with the outer peripheral surface from the upper end surface is formed to the fixed die plate 4. Similarly, a through hole communicating with the outer peripheral surface from the lower end surface is formed to the moving die plate 9.

The inert gas (arrow A) is directly led into the forming chamber 13 through the supply port 33 and then used for adjusting the atmosphere in the forming chamber. Moreover, the inert gas (arrow B) is led into the forming chamber 13 through the inside of the fixed shaft 1, the heat insulating cylinder 3 and the fixed die plate 4. The inert gas (arrow B) is used for cooling down the fixed shaft 1 and cooling down the upper die 1 after press forming. Similarly, the inert gas (arrow C) is led into the forming chamber 13 through the inside of the moving shaft 7, the heat insulating cylinder 8 and the moving die plate 9. This inert gas (arrow B) is used for cooling down the moving shaft 7 and cooling down the lower die 17 after press forming.

After adjusting the atmosphere in the forming chamber 13, the infrared lamp unit 23 is used to heat the upper die 16 and the lower die 17. As a result, the preform 12 is heated to a predetermined forming temperature through the upper die 16 and the lower die 17. Subsequently, the moving shaft 7 is driven upwards and the preform 12 is press-formed between the upper and lower dies 16 and 17. After press forming, the inert gas is caused to flow with the formed product being held between the upper and lower dies 16 and 17, and the upper and lower dies 16 and 17 and the formed product are cooled down to a predetermined die opening temperature. D denotes a chamber exhaust.

It is to be noted that the infrared lamp unit 23, the quartz tube 20 and their incidental facilities are fixed to the lower side of the upper plate 19 and they can be integrally lifted up by a driving device (not shown). Therefore, at the time of mounting the preform 12 to the lower die 17 or taking out the formed product after press forming, the inside of the forming chamber can be opened by retracting the infrared lamp unit 23 and the quartz tube 20 upwards.

Figure 2:
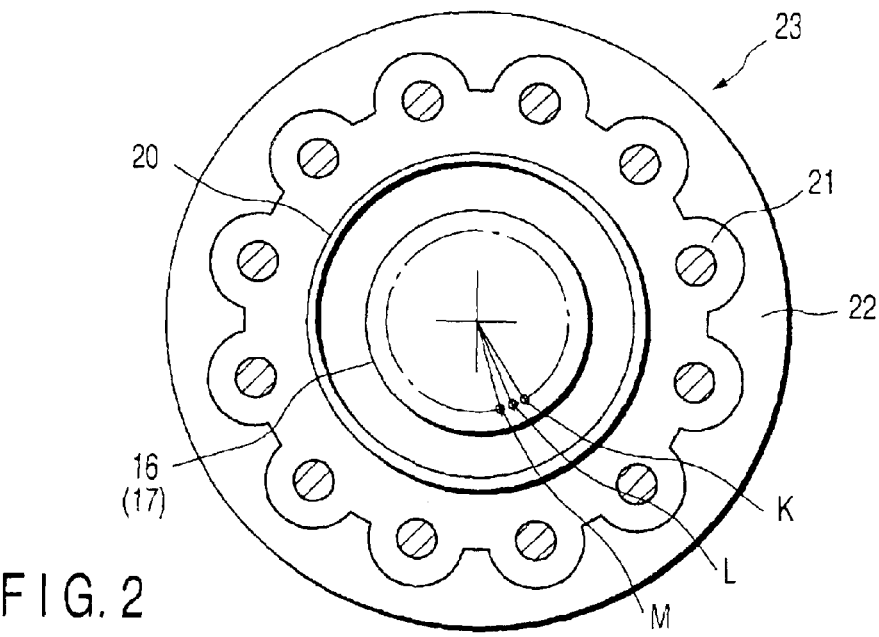
FIG. 2 is a lateral cross-sectional view of an infrared lamp unit used in a press forming machine for an optical device according to the present invention.

FIG. 2 shows a lateral cross-sectional view of the infrared lamp unit 23. The infrared lamp unit 23 is constituted by a plurality of the straight tube type infrared lamps 21 each having a vertical axis. These infrared lamps are arranged in the circumferential direction around the quartz tube 20 at equal intervals. In this example, 12 straight tube lamps are used in order to assure the uniformity of the radiant energy in the circumferential direction. The reflecting mirrors 22 are arranged behind the respective infrared lamps 21. Constituting the infrared lamp unit 23 in this manner can enhance the temperature uniformity in the circumferential direction of the upper die 16 and the lower die 17.

The press forming machine according to the present invention is superior in the temperature uniformity of the upper die 16 and the lower die 17. Therefore, when the fixed die 5, the moving die 10, the upper cavity die 6 and the lower cavity die 11 having the high accuracy of surface and that of combination are used, shapes of these members can be faithfully transferred to the formed product. As a result, it is possible to manufacture an optical device having the high accuracy of form without using a polishing process.

Description will now be given as to the result obtained by comparing the temperature distribution in the dies between the press forming machine according to the present invention and the prior art press forming machine.

It is generally considered that main factors causing astigmatism to be generated to a lens produced by using the press forming method are the non-uniformity of pressing force, a difference in a quantity of thermal expansion inside the dies due to uneven heating, a difference in a quantity of heat shrinkage at the time of cooling, and others.

Figure 3:
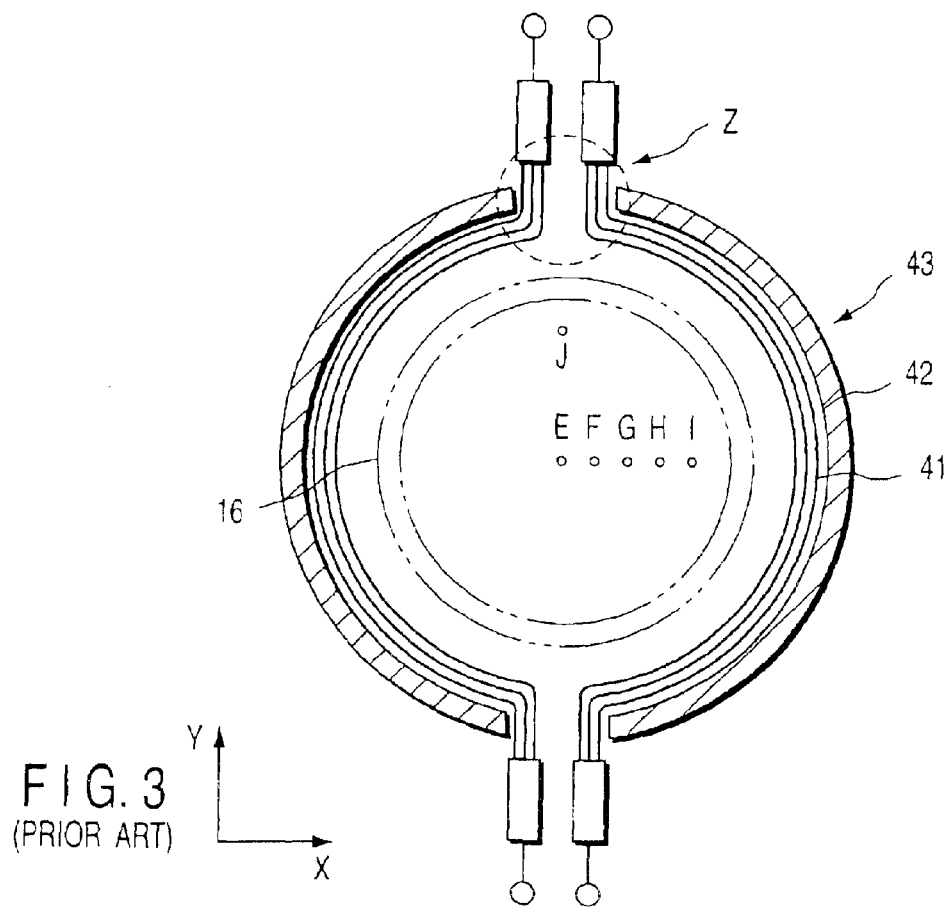
FIG. 3 is a lateral cross-sectional view of an infrared lamp unit used in a conventional press forming machine for an optical device.

In the prior art press forming machine, small astigmatism is generated. That is because the opposed portion (arrow Z) of the infrared lamp 41 exists in the prior art forming machine as shown in FIG. 3, and a quantity of the radiant energy incident upon the part facing this opposed portion hence becomes relatively small. Thus, the dies can not be evenly heated. On the contrary, according to the press forming machine of the present invention, it is possible to enhance the uniformity of a quantity of the radiant energy incident upon the dies in the circumferential direction by using a sufficient number of straight tube infrared lamps and appropriately selecting the shape of the reflecting mirrors. Consequently, generation of astigmatism can be suppressed.

The conventional press forming machine was first used to measure the temperature distribution inside the die. As shown in FIG. 3, five measuring points (E, F, G, H and I) were provided at equal intervals in a direction (direction of an X axis) vertical to a direction (direction of a Y axis) which passes through the center of the upper die 16 and the opposed portion of the infrared lamp 41. Additionally, one measuring point (J) was provided in the vicinity of the opposed portion of the infrared lamp 41. The diameter of the upper die 16 was 60 mm.

After heating the upper die 16 to 800° C., the temperature was maintained for 30 seconds. After the temperature distribution in the die became stable, a temperature at each measuring point was measured. As a result, the temperatures at the measuring points E, F, G, H and I became higher toward the outer periphery, and a difference in temperature between the measuring point I and another measuring point E was approximately 2° C. The temperature at the measuring point J was lower than that at the measuring point I by approximately 10° C. Based on this result, it was confirmed that the die extends in the X-axis direction.

Subsequently, the temperature distribution in the die was measured by using the press forming machine according to the present invention. The same die as that in the prior art machine was used, and measuring points (E, F, G, H, I and J) were provided at the same positions to measure a temperature at each point. As a result, the temperatures at the measuring points E, F, G, H and I became higher towards the outer periphery, and a difference in temperature between the measuring point I and another measuring point E was approximately 2° C. The temperature at the measuring point J was lower than that at the measuring point I by approximately 2° C.

Moreover, in the press forming machine according to the present invention, three measuring points (K, L and M) having different relative positions to the infrared lamp 21 were provided along the circumferential direction as shown in FIG. 2, and the temperature distribution in the upper die 16 was measured. As to these measuring points, the measuring point M is positioned in front of the infrared lamp 21; the measuring point K, in front of the center of the infrared lamps 21 adjacent to each other; and the measuring point L, in the middle of the measuring point M and the measuring point K. Consequently, it was confirmed that a difference in temperature between the measuring points K, L and M can be not more than 1° C. and the temperature of the die is not affected by a difference in relative position to the infrared lamp 21.

With the press forming machine (FIG. 1 and FIG. 2) according to the present invention, an optical lens having the diameter of 30 mm was press-formed from optical glass having a yield point of approximately 650° C. The press-forming is performed at a temperature of 640° C. with press force of 1200 kgf. Then, an excellent optical device with almost no astigmatism was obtained.

According to the press forming machine for a glass optical device of the present invention, this press forming machine is superior to the prior art using the semi-circular infrared lamp as a heating source in the temperature uniformity of the die to be heated. As a result, it is possible to manufacture a glass optical device having the high accuracy of form. Further, since the straight tube infrared lamps are used, the manufacturing cost can be suppressed to be lower than that of the prior art semi-circular infrared lamp.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A press forming machine for glass optical devices, comprising:

a pair of upper and lower dies for press-forming a glass material;

an infrared lamp unit which is arranged around said dies and heats said dies and said glass material, wherein said infrared lamp unit is constituted by straight tube type infrared lamps, and each of said infrared lamps has a vertical axis and is arranged around said dies in the circumferential direction; and a nozzle for blasting air or an inert gas directly to a terminal portion of said straight tube type infrared lamp is provided.

2. The press forming machine for glass optical devices according to claim 1, wherein dimples are formed on a casing of said straight tube type infrared lamp.

* * * * *